United States Patent
Czimmermann et al.

(10) Patent No.: US 12,056,508 B2
(45) Date of Patent: *Aug. 6, 2024

(54) STATE MACHINE BASED SCRIPT APPLICATIONS AND SYSTEMS

(71) Applicant: Nutcracker Therapeutics, Inc., Emeryville, CA (US)

(72) Inventors: Tamas Czimmermann, Hayward, CA (US); Kenneth Jordan, Danville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/234,181

(22) Filed: Aug. 15, 2023

(65) Prior Publication Data

US 2023/0385078 A1    Nov. 30, 2023

Related U.S. Application Data

(63) Continuation of application No. 17/899,023, filed on Aug. 30, 2022, now Pat. No. 11,762,674.

(60) Provisional application No. 63/238,994, filed on Aug. 31, 2021.

(51) Int. Cl.
G06F 9/451     (2018.01)
G06F 9/448     (2018.01)
G06F 9/455     (2018.01)

(52) U.S. Cl.
CPC ........ G06F 9/4498 (2018.02); G06F 9/45512 (2013.01)

(58) Field of Classification Search
CPC .................................................... G06F 9/451
See application file for complete search history.

(56) References Cited

U.S. PATENT DOCUMENTS

| | | | | |
|---|---|---|---|---|
| 3,573,445 A | * | 4/1971 | Korytnaja ............... | G06F 11/22 714/34 |
| 4,980,780 A | * | 12/1990 | Tanaka ................. | H04N 1/2307 358/401 |
| 5,805,796 A | * | 9/1998 | Finch ...................... | G06F 11/00 710/17 |
| 6,163,879 A | * | 12/2000 | Mackey .................... | G06F 8/33 715/744 |
| 8,127,033 B1 | * | 2/2012 | Newstadt .............. | G06F 16/972 709/224 |
| 2007/0294704 A1 | * | 12/2007 | Stephen .................... | G06F 8/51 719/315 |

(Continued)

*Primary Examiner* — Jae U Jeon
(74) *Attorney, Agent, or Firm* — Frost Brown Todd LLP

(57) ABSTRACT

An example system includes a plurality of scriptable devices, each of which exposes an interface. The system may also comprise a medium storing data indicating, for each of a mapped plurality of device operations, one or more inputs to provide to a corresponding device from the plurality of scriptable devices and a conversion between that device operation and a corresponding application command. In such a system, the medium may also store a plurality of scripts, each of which may have a corresponding scriptable device from the plurality of scriptable devices and may comprise a set of device operations. The system may also comprise a computer to repeatedly preform an operation cycle comprising determining whether an application command should be executed and, when it should, generating a globally unique identifier corresponding to that command and adding that globally unique identifier and a device operation corresponding to that command to a log.

20 Claims, 11 Drawing Sheets

(56) References Cited

U.S. PATENT DOCUMENTS

| | | | |
|---|---|---|---|
| 2008/0244514 A1* | 10/2008 | Hilerio | G06F 9/5055 |
| | | | 717/115 |
| 2013/0293494 A1* | 11/2013 | Reshef | G06F 3/041 |
| | | | 345/173 |
| 2014/0189672 A1* | 7/2014 | Raundahl Gregersen | |
| | | | G06F 8/656 |
| | | | 717/168 |
| 2017/0199757 A1* | 7/2017 | Fountain | G06Q 10/06 |
| 2021/0209271 A1* | 7/2021 | Olson | G16H 40/20 |

* cited by examiner

STATE MACHINE BASED SCRIPT APPLICATIONS AND SYSTEMS

This application claims the benefit of and priority to U.S. Provisional Patent Application Ser. No. 63/238,994, filed Aug. 31, 2021, entitled "State Machine Based Script Applications and Systems," which itself claims the benefit of, and priority to U.S. Non-provisional patent application Ser. No. 17/899,023, entitled "State Machine Based Script Applications and Systems," the disclosures of each of which are incorporated by reference in their entirety herein.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Some currently available technologies for developing applications such as those used in manufacturing and formulating polynucleotide therapeutics (e.g., mRNA therapeutics, etc.) may be unable to integrate external scripts such as scripts that may be created by a process engineer. Additionally, applications created with such technologies may provide insufficient traceability in the event an error is encountered, either in execution or elsewhere.

SUMMARY

Improved frameworks may improve both the development and operation of applications. Structuring applications as modular non-blocking state machines may advance these goals, and incorporating functionality such as integration of external scripts and logging of data and application activities may improve traceability and, where applicable, regulatory compliance. Described herein are systems and methods which may be used in creating and operating such applications, including as may be applied to the control of systems for polynucleotide manufacturing.

An implementation relates to a system that includes a plurality of scriptable devices, wherein each scriptable device: exposes an interface; and is adapted to perform predefined actions based on inputs provided to it via its interface; a non-transitory computer readable medium storing: data indicating, for each of a mapped plurality of device operations: one or more inputs to provide to a corresponding device from the plurality of scriptable devices when performing that device operation; and a conversion between that device operation and a corresponding application command; a plurality of scripts, wherein each script from the plurality of scripts: has a corresponding scriptable device from the plurality of scriptable devices; and comprises a set of device operations; and a computer to perform acts comprising: performing an operation cycle comprising: determining whether an application command should be executed; and based on determining that the application command should be executed: generating a globally unique identifier corresponding to that application command; and adding the globally unique identifier corresponding to that application command and a device operation corresponding to that application command to a log; and repeating the operation cycle one or more times.

In some implementations of a system, such as that described in the preceding paragraph of this summary, the acts the computer is to perform comprise, for each device from the plurality of scriptable devices: determining when each device operation from each script for which that device is the corresponding scriptable device is comprised by the mapped plurality of device operations; and for each script for which that device is the corresponding scriptable device and which comprises a device operation which is determined not to be comprised by the mapped plurality of device operations, generating an error message.

In some implementations of a system, such as described in any of the second or third paragraphs of this summary, the non-transitory computer readable medium further stores data indicating, for each of the mapped plurality of device operations, a corresponding device module definition which defines a device module object to execute the corresponding application command for that device operation; and for each of the mapped plurality of device operations, the data indicating the conversion between that device operation and the corresponding application command, is comprised by the device module definition corresponding to that device operation.

In some implementations of a system such as described in the preceding paragraph of this summary, the operation cycle may comprise receiving a run command to run a script from the plurality of scripts; in response to receiving the run command, for each device operation from the plurality of device operation comprised by the script: confirming that that device operation is comprised by the mapped plurality of device operations; and confirming that the device operation with any associated parameters is executable by the device module defined by the device module definition corresponding to that device operation.

In some implementations of a system, such as described in any of the second through fifth paragraphs of this summary, when performing the operation cycle, determining whether the application command should be executed may comprise: enqueuing the application command in a queue corresponding to the device corresponding to the application command's corresponding device operation, which device is referred to herein as the application command's corresponding device; and checking a state corresponding to a thread corresponding to the application command's corresponding device In some implementations of a system, such as described in any of the second through fifth paragraphs of this summary, when performing the operation cycle, determining whether the application command should be executed comprises receiving an instruction to control the device corresponding to the application command's corresponding device operation via a graphical user interface.

Another implementation relates to a method that includes accessing a non-transitory computer readable medium storing a module class definition; obtaining a plurality of device object definitions, wherein each device object definition: corresponds to a physical device; inherits from the module class definition; and specifies, for each of a plurality of commands executable by that device object definition's corresponding physical device: a state corresponding to that command; one or more operations to execute in the state corresponding to that command; and one or more inputs to issue to the physical device corresponding to that device; obtaining a plurality of intermediate module definitions, wherein each intermediate module definition: inherits from the module class definition; and comprises references to a set of device objects, each of which corresponds to a device object definition; obtaining a module manager definition, wherein the module manager definition: inherits from the module class definition; and comprises references to a plurality of intermediate modules, each of which corresponds to an intermediate module definition; launching an application, wherein launching the application comprises for each device object definition: allocate memory for the device object corresponding to that device object definition, wherein the device object corresponding to that device object definition comprises a command queue; allocate a corresponding thread to execute instructions to: track a current state of the device object corresponding to that device object definition; when the current state of the device object corresponding to that device object definition is the same as a state specified in that device object definition, execute one or more operations specified for that command; and determine whether to update the current state of the device object corresponding to that device object definition based on presence and priority of a command in the command queue comprised by the device object corresponding to that device object definition; for each intermediate module definition: allocate memory for the intermediate module corresponding to that intermediate module definition; and allocate a corresponding thread to execute instructions to send commands to the device objects having references comprised by the intermediate module corresponding to that intermediate module definition.

In some implementations of a method such as described in the preceding paragraph of this summary, each device object definition specifies set of operations to execute while the device object defined by that device object definition is in an idle state; and for each device object definition, the corresponding thread is to execute the set of operations specified to execute while the device object defined by that device object definition is in idle state.

In some implementations of a method such as described in the preceding paragraph of this summary, the plurality of device object definitions comprises a temperature controller device object definition; the set of operations the temperature controller device object definition specifies to execute while the device object defined by the temperature controller device object definition is in idle state comprises checking a temperature of the system.

In some implementations of a method such as described in any of the eighth through tenth paragraphs of this summary, for each device object definition, all loop comprised by that device object definition have a deterministic end.

In some implementations of a method such as described in any of the eighth through eleventh paragraphs of this summary, each data object defined by a definition that inherits from the module class definition: is a state machine having states comprising: an idle state; a stop state; a shutdown state; and a bootup state; and comprises a command queue.

In some implementations of a method such as described in any of the eighth through twelfth paragraphs of this summary, for each device object definition, the module manager definition comprises instructions to control the physical device corresponding to that device object definition by acts comprising: instantiating a command object; and passing the command object to the intermediate module defined by the intermediate module definition which comprises a reference to the device object corresponding to that device object definition; the command object is defined by a command object definition; and both the command object definition and the module class definition inherit from a base object definition.

In some implementations of a method such as described in the preceding paragraph of this summary, the base object definition comprises instructions to, whenever an object defined by a definition that inherits from the base object definition is instantiated: generate a unique identifier for that object; and store the unique identifier in that object as private data.

Another implementation relates to a system that includes a plurality of scriptable devices, wherein each scriptable device: is a physical device; exposes an interface; and is adapted to perform predefined actions based on inputs provided to it via its interface; a non-transitory computer readable medium storing: data indicating, for each of a mapped plurality of device operations: one or more inputs to provide to a corresponding device from the plurality of scriptable devices when performing that device operation; a conversion between that device operation and a corresponding application command; and a plurality of intermediate module definitions, wherein each intermediate module definition comprises references to a set of device objects, each of which corresponds to one of the scriptable devices; a plurality of scripts, wherein each script from the plurality of scripts: has a corresponding scriptable device from the plurality of scriptable devices; and comprises a set of device operations; and a computer to perform acts comprising: launching an application, wherein launching the application comprises for each scriptable device: allocate memory for a device object corresponding to that scriptable device; allocate a corresponding thread to execute instructions to: track a current state of the device object corresponding to that device object definition; when the current state of the device object corresponding to that device object definition is the same as a state specified in that device object definition, execute one or more operations specified for that command; and determine whether to update the current state of the device object corresponding to that device object definition based on presence and priority of a command in the command queue comprised by the device object corresponding to that device object definition; for each intermediate module definition: allocate memory for an intermediate module corresponding to that intermediate module definition; and allocate a corresponding thread to execute instructions to send commands to the device objects having references comprised by the intermediate module corresponding to that intermediate module definition performing an operation cycle comprising: determining whether an application command should be executed; and based on determining that the application command should be executed: generating a globally unique identifier corresponding to that application command; and adding the globally unique identifier corresponding to that application command and a device operation corresponding to that application command to a log; and repeating the operation cycle one or more times.

In some implementations of a system, such as that described in the preceding paragraph of this summary, the acts the computer is to perform comprise, for each device from the plurality of scriptable devices: determining when each device operation from each script for which that device is the corresponding scriptable device is comprised by the mapped plurality of device operations; and for each script for which that device is the corresponding scriptable device and which comprises a device operation which is determined not to be comprised by the mapped plurality of device operations, generating an error message.

In some implementations of a system, such as that described in any of the fifteenth through sixteenth paragraphs of this summary, the non-transitory computer readable medium further stores data indicating, for each of the mapped plurality of device operations, a corresponding device module definition which defines a device module object to execute the corresponding application command for that device operation; and for each of the mapped plurality of device operations, the data indicating the conversion between that device operation and the corresponding application command, is comprised by the device module definition corresponding to that device operation.

In some implementations of a system, such as that described in the preceding paragraph of this summary, the operation cycle may comprise: receiving a run command to run a script from the plurality of scripts; in response to receiving the run command, for each device operation from the plurality of device operation comprised by the script: confirming that that device operation is comprised by the mapped plurality of device operations; and confirming that the device operation with any associated parameters is executable by the device module defined by the device module definition corresponding to that device operation.

In some implementations of a system, such as that described in any of the fifteenth through eighteenth paragraphs of this summary, the operation cycle comprises, based on determining that the application command should be executed: instantiating a command object corresponding to that application command; and passing the command object to an intermediate module; and the command object, each device object, and each intermediate module instantiate a class that inherits from a common base object definition.

In some implementations of a system, such as that described in the preceding paragraph of this summary, the base object definition comprises instructions to, whenever an object defined by a definition that inherits from the base object definition is instantiated: generate a unique identifier for that object; and store the unique identifier in that object as private data.

In some implementations of a system, such as that described in any of the fifteenth through twentieth paragraphs of this summary, for each scriptable device, all loops comprised by the thread corresponding to that scriptable device have a deterministic end.

It should be appreciated that all combinations of the foregoing concepts and additional concepts discussed in greater detail below (provided such concepts are not mutually inconsistent) are contemplated as being part of the inventive subject matter disclosed herein and to achieve the benefits as described herein.

BRIEF DESCRIPTION OF THE DRAWINGS

The details of one or more implementations are set forth in the accompanying drawings and the description below. Other features, aspects, and advantages will become apparent from the description, the drawings, and the claims, in which:

DETAILED DESCRIPTION

Figure 1:
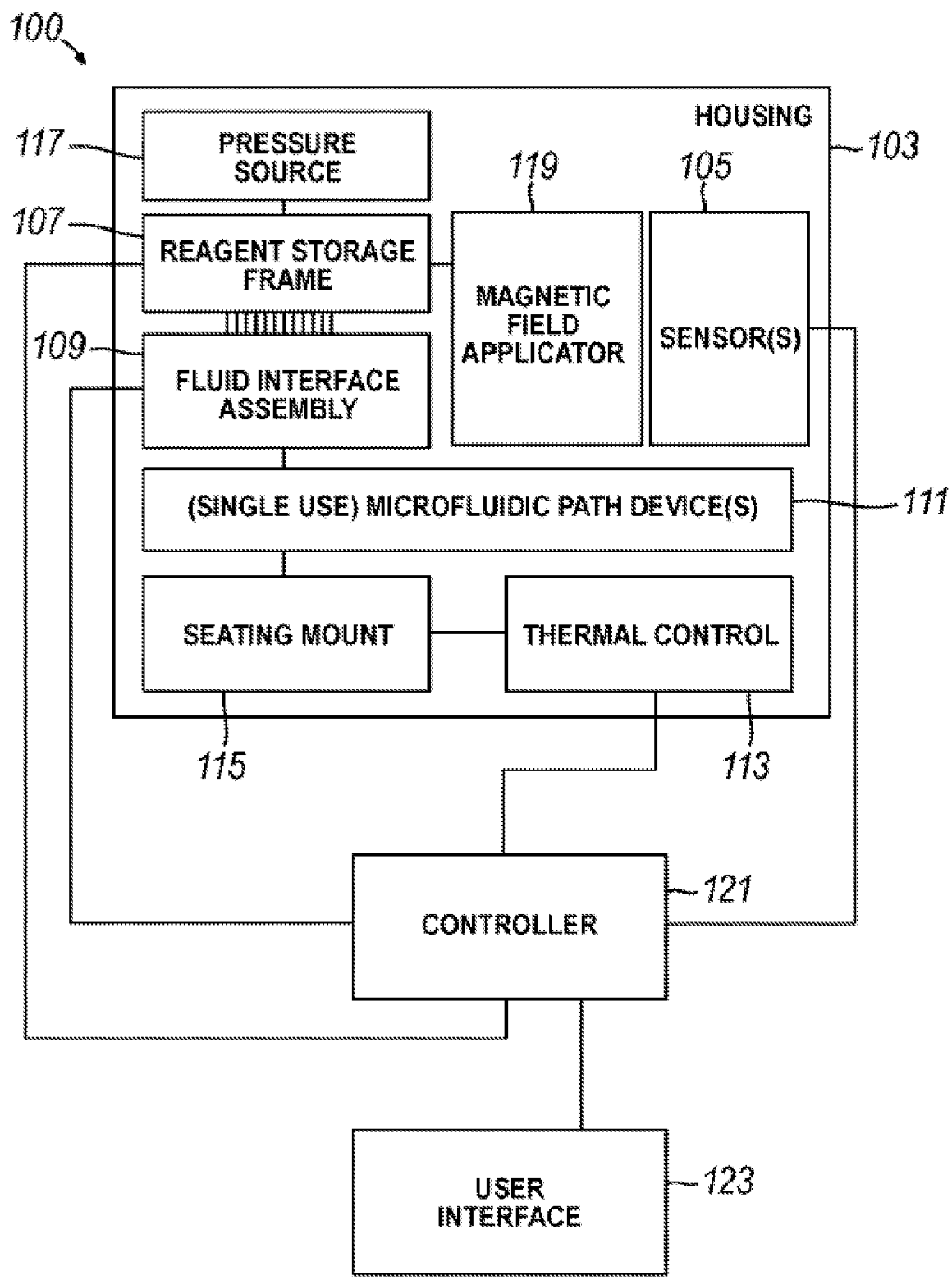
FIG. 1 depicts a schematic view of an example of a system including a microfluidic process chip.

In some aspects, apparatuses and methods are disclosed herein for developing applications which allow integration with external scripts as well as providing traceability in the event of an error. In particular, these apparatuses and methods may provide an object oriented framework that is configured to support modularity and reuse integration structures representing individual devices into complex processes. The objects in such a framework may include objects which are adapted to execute as state machines and objects which are adapted to encode commands from scripts. These objects may also inherit from base classes which provide functionality of automatically generating unique identifiers which may later be used in debugging and/or other error correction. Applications developed using aspects of the disclosed technology may be used for a variety of purposes, including the synthesis of patient-specific therapeutics, including compounding, at a point of care (e.g., hospital, clinic, pharmacy, etc.).

I. Terminology

Throughout this specification and the claims which follow, unless the context requires otherwise, the word "comprise," and variations such as "comprises" and "comprising" means various components may be co-jointly employed in the methods and articles (e.g., compositions and apparatuses including device and methods). For example, the term "comprising" will be understood to imply the inclusion of any stated elements or steps but not the exclusion of any other elements or steps. In general, any of the apparatuses and methods described herein should be understood to be inclusive, but all or a sub-set of the components and/or steps may alternatively be exclusive and may be expressed as "consisting of" or alternatively "consisting essentially of" the various components, steps, sub-components, or sub-steps.

As used herein, the singular forms "a," "an," and "the" are intended to include the plural forms as well, unless the context clearly indicates otherwise. As used herein, the term "and/or" includes any and all combinations of one or more of the associated listed items and may be abbreviated as "/".

Spatially relative terms, such as "under," "below," "lower," "over," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the term "under" may encompass both an orientation of over and under. The device may be otherwise oriented (rotated 90 degrees or at other orientations) and the spatially relative descriptors used herein interpreted accordingly. Similarly, the terms "upwardly," "downwardly," "vertical," "horizontal," and the like are used herein for the purpose of explanation only unless specifically indicated otherwise.

When a feature or element is herein referred to as being "on" another feature or element, it may be directly on the other feature or element or intervening features and/or elements may also be present. In contrast, when a feature or element is referred to as being "directly on" another feature or element, there are no intervening features or elements present. When a feature or element is referred to as being "connected," "attached," or "coupled" to another feature or element, it may be directly connected, attached, or coupled to the other feature or element or intervening features or elements may be present. In contrast, when a feature or element is referred to as being "directly connected," "directly attached," or "directly coupled" to another feature or element, there are no intervening features or elements present. Although described or shown with respect to one embodiment, the features and elements so described or shown may apply to other embodiments. It will also be appreciated by those skilled in the art that references to a structure or feature that is disposed "adjacent" another feature may have portions that overlap or underlie the adjacent feature.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is ±0.1% of the stated value (or range of values), ±1% of the stated value (or range of values), ±2% of the stated value (or range of values), ±5% of the stated value (or range of values), ±10% of the stated value (or range of values), etc. Any numerical values given herein should also be understood to include about or approximately that value unless the context indicates otherwise. For example, if the value "10" is disclosed, then "about 10" is also disclosed. Any numerical range recited herein is intended to include all sub-ranges subsumed therein.

It is also understood that when a value is disclosed that "less than or equal to" the value, "greater than or equal to the value," and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although the terms "first" and "second" may be used herein to describe various features/elements (including steps), these features/elements should not be limited by these terms, unless the context indicates otherwise. These terms are used to distinguish one feature/element from another feature/element, and unless specifically pointed out, do not denote a certain order. Thus, a first feature/element discussed below could be termed a second feature/element, and similarly, a second feature/element discussed below could be termed a first feature/element without departing from the teachings of the present invention.

As used herein, the terms "system," "apparatus," and "device" may be read as being interchangeable with each other. A system, apparatus, and device may each include a plurality of components having various kinds of structural and/or functional relationships with each other.

As used herein "based on" may be read as indicating that a thing is determined at least on part on what it is indicated as being "based on." "Based EXCLUSIVELY on" may be read as indicating that a thing is required to be determined entirely by what it is indicated as being "based EXCLUSIVELY on."

II. Overview of Exemplary System For State Machine Based Control

FIG. 1 depicts examples of various components that may be incorporated into a system (100). System (100) of this example includes a housing (103) enclosing a seating mount (115) that may removably hold one or more microfluidic process chips (111). In other words, system (100) includes a chip-receiving component that is configured to removably accommodate a process chip (111), where the process chip (111) itself defines one or more microfluidic channels or fluid pathways. Components of system (100) (e.g., within housing (103)) that fluidically interact with process chip (111) may include fluid channels or pathways that are not necessarily considered microfluidic (e.g., with such fluid channels or pathways being larger than the microfluidic channels or fluid pathways in process chip (111)). In some versions, process chips (111) are provided and utilized as single-use devices, while the rest of system (100) is reusable. Housing (103) may be in the form of a chamber, enclosure, etc., with an opening that may be closed (e.g., via a lid or door, etc.) to thereby seal the interior. Housing (103) may enclose a thermal regulator and/or may be configured to be enclosed in a thermally-regulated environment (e.g., a refrigeration unit, etc.). Housing (103) may form an aseptic barrier. In some variations, housing (103) may form a humidified or humidity-controlled environment. In addition, or in the alternative, system (100) may be positioned in a cabinet (not shown). Such a cabinet may provide a temperature-regulated (e.g., refrigerated) environment. Such a cabinet may also provide air filtering and air flow management and may promote reagents being kept at a desired temperature through the manufacturing process. In addition, such a cabinet may be equipped with UV lamps for sterilization of process chip (111) and other components of system (100). Other suitable features may be incorporated into a cabinet that houses system (100).

In some scenarios, the assembly formed by housing (103) and the components of system (100) that are within housing (103), without process chip (111), may be considered as being an "instrument." While controller (121) and user interface (123) are shown in FIG. 1 as being outside of housing (103), controller (121) and user interface (123) may in fact be provided in or on housing (103) and may thus also form part of the instrument. As described in greater detail below, this instrument may removably receive process chip (111) via a seating mount (115). When process chip (111) is seated in seating mount (115), the instrument and process chip (111) cooperate to together form system (100). When process chip (111) is removed from seating mount (115), the portion of system (100) that is left may be regarded as the "instrument." The instrument, the system (100), and process chip (111) may each be considered an "apparatus." The term "apparatus" may thus be read to include the instrument by itself, a process chip (111) by itself, the combination of the instrument and process chip (111), some other combination of components of system (100), or some other permutation of system (100) or components thereof.

Seating mount (115) may be configured to secure process chip (111) using one or more pins or other components configured to hold process chip (111) in a fixed and predefined orientation. Seating mount (115) may thus facilitate process chip (111) being held at an appropriate position and orientation in relation to other components of system (100). In the present example, seating mount (115) is configured to hold process chip (111) in a horizontal orientation, such that process chip (111) is parallel with the ground.

In some variations, a thermal control (113) may be located adjacent to seating mount (115), to modulate the temperature of any process chip (111) mounted in seating mount (115). Thermal control (113) may include a thermoelectric component (e.g., Peltier device, etc.) and/or one or more heat sinks for controlling the temperature of all or a portion of any process chip (111) mounted in seating mount (115). In some variations, more than one thermal control (113) may be included, such as to separately regulate the temperature of different ones of one or more regions of process chip (111). Thermal control (113) may include one or more thermal sensors (e.g., thermocouples, etc.) that may be used for feedback control of process chip (111) and/or thermal control (113).

As shown in FIG. 1, a fluid interface assembly (109) couples process chip (111) with a pressure source (117), thereby providing one or more paths for fluid (e.g., gas) at a positive or negative pressure to be communicated from pressure source (117) to one or more interior regions of process chip (111) as will be described in greater detail below. While only one pressure source (117) is shown, system (100) may include two or more pressure sources (117). In some scenarios, pressure may be generated by one or more sources other than pressure source (117). For instance, one or more vials or other fluid sources within reagent storage frame (107) may be pressurized. In addition, or in the alternative, reactions and/or other processes carried out on process chip (111) may generate additional fluid pressure. In the present example, fluid interface assembly (109) also couples process chip (111) with a reagent storage frame (107), thereby providing one or more paths for liquid reagents, etc., to be communicated from reagent storage frame (107) to one or more interior regions of process chip (111) as will be described in greater detail below.

In some versions, pressurized fluid (e.g., gas) from at least one pressure source (117) reaches fluid interface assembly (109) via reagent storage frame (107), such that reagent storage frame (107) includes one or more components interposed in the fluid path between pressure source (117) and fluid interface assembly (109). In some versions, one or more pressure sources (117) are directly coupled with fluid interface assembly, such that the positively pressurized fluid (e.g., positively pressurized gas) or negatively pressurized fluid (e.g., suction or other negatively pressurized gas) bypasses reagent storage frame (107) to reach fluid interface assembly (109). Regardless of whether the fluid interface assembly (109) is interposed in the fluid path between pressure source (117) and fluid interface assembly (109), fluid interface assembly (109) may be removably coupled to the rest of system (100), such that at least a portion of fluid interface assembly (109) may be removed for sterilization between uses. As described in greater detail below, pressure source (117) may selectively pressurize one or more chamber regions on process chip (111). In addition, or in the alternative, pressure source may also selectively pressurize one or more vials or other fluid storage containers held by reagent storage frame (107).

Reagent storage frame (107) is configured to contain a plurality of fluid sample holders, each of which may hold a fluid vial that is configured to hold a reagent (e.g., nucleotides, solvent, water, etc.) for delivery to process chip (111). In some versions, one or more fluid vials or other storage containers in reagent storage frame (107) may be configured to receive a product from the interior of the process chip (111). In addition, or in the alternative, a second process chip (111) may receive a product from the interior of a first process chip (111), such that one or more fluids are transferred from one process chip (111) to another process chip (111). In some such scenarios, the first process chip (111) may perform a first dedicated function (e.g., synthesis, etc.) while the second process chip (111) performs a second dedicated function (e.g., encapsulation, etc.). Reagent storage frame (107) of the present example includes a plurality of pressure lines and/or a manifold configured to divide one or more pressure sources (117) into a plurality of pressure lines that may be applied to process chip (111). Such pressure lines may be independently or collectively (in sub-combinations) controlled.

Fluid interface assembly (109) may include a plurality of fluid lines and/or pressure lines where each such line includes a biased (e.g., spring-loaded) holder or tip that individually and independently drives each fluid and/or pressure line to process chip (111) when process chip (111) is held in seating mount (115). Any associated tubing (e.g., the fluid lines and/or the pressure lines) may be part of fluid interface assembly (109) and/or may connect to fluid interface assembly (109). In some versions, each fluid line comprises a flexible tubing that connects between reagent storage frame (107), via a connector that couples the vial to the tubing in a locking engagement (e.g., ferrule) and process chip (111). In some versions, the ends of the fluid lines/pressure lines may be configured to seal against process chip (111) (e.g., at a corresponding sealing port formed in process chip (111)), as described below. In the present example, the connections between pressure source (117) and process chip (111), and the connections between vials in reagent storage frame (107) and process chip (111), all form sealed and closed paths that are isolated when process chip (111) is seated in seating mount (115). Such sealed, closed paths may provide protection against contamination when processing therapeutic polynucleotides.

The vials of reagent storage frame (107) may be pressurized (e.g., >1 atm pressure, such as 2 atm, 3 atm, 5 atm, or higher). In some versions, the vials may be pressurized by pressure source (117). Negative or positive pressure may thus be applied. For example, the fluid vials may be pressurized to between about 1 and about 20 psig (e.g., 5 psig, 10 psig, etc.). Alternatively, a vacuum (e.g., about −7 psig or about 7 psia) may be applied to draw fluids back into the vials (e.g., vials serving as storage depots) at the end of the process. The fluid vials may be driven at lower pressure than the pneumatic valves as described below, which may prevent or reduce leakage. In some variations, the difference in pressure between the fluid and pneumatic valves may be between about 1 psi and about 25 psi (e.g., about 3 psi, about 5 psi, 7 psi, 10 psi, 12 psi, 15 psi, 20 psi, etc.).

System (100) of the present example further includes a magnetic field applicator (119), which is configured to create a magnetic field at a region of the process chip (111). Magnetic field applicator (119) may include a movable head that is operable to move the magnetic field to thereby selectively isolate products that are adhered to magnetic capture beads within vials or other storage containers in reagent storage frame (107).

System (100) of the present example further includes one or more sensors (105). In some versions, such sensors (105) include one or more cameras and/or other kinds of optical sensors. Such sensors (105) may sense one or more of a barcode, a fluid level within a fluid vial held within reagent storage frame (107), fluidic movement within a process chip (111) that is mounted within seating mount (115), and/or other optically detectable conditions. In versions where a sensor (105) is used to sense barcodes, such barcodes may be included on vials of reagent storage frame (107), such that sensor (105) may be used to identify vials in reagent storage frame (107). In some versions, a single sensor (105) is positioned and configured to simultaneously view such barcodes on vials in reagent storage frame (107), fluid levels in vials in reagent storage frame (107), fluidic movement within a process chip (111) that is mounted within seating mount (115), and/or other optically detectable conditions. In some other versions, more than one sensor (105) is used to view such conditions. In some such versions, different sensors (105) may be positioned and configured to separately view corresponding optically detectable conditions, such that a sensor (105) may be dedicated to a particular corresponding optically detectable condition.

In versions where sensors (105) include at least one optical sensor, visual/optical markers may be used to estimate yield. For example, fluorescence may be used to detect process yield or residual material by tagging with fluorophores. In addition, or in the alternative, dynamic light scattering (DLS) may be used to measure particle size distributions within a portion of the process chip (111) (e.g., such as a mixing portion of process chip (111)). In some variations, sensor (105) may provide measurements using one or two optical fibers to convey light (e.g., laser light) into process chip (111); and detect an optical signal coming out of process chip (111). In versions where sensor (105) optically detects process yield or residual material, etc., sensor (105) may be configured to detect visible light, fluorescent light, an ultraviolet (UV) absorbance signal, an infrared (IR) absorbance signal, and/or any other suitable kind of optical feedback.

In versions where sensors (105) include at least one optical sensor that is configured to capture video images, such sensors (105) may record at least some activity on process chip (111). For example, an entire run for synthesizing and/or processing a material (e.g., a therapeutic RNA) may be recorded by one or more video sensors (105), including a video sensor (105) that may visualize process chip (111) (e.g., from above). Processing on process chip (111) may be visually tracked and this video record may be retained for later quality control and/or processing. Thus, the video record of the processing may be saved, stored, and/or transmitted for subsequent review and/or analysis. In addition, as will be described in greater detail below, the video may be used as a real-time feedback input that may affect processing using at least visually observable conditions captured in the video.

System (100) of the present example may be controlled by a controller (121). Controller (121) may include one or more processors, one or more memories, and various other suitable electrical components. In some versions, one or more components of controller (121) (e.g., one or more processors, etc.) is/are embedded within system (100) (e.g., contained within housing (103)). In addition, or in the alternative, one or more components of controller (121) (e.g., one or more processors, etc.) may be detachably attached or detachably connected with other components of system (100). Thus, at least a portion of controller (121) may be removable. Moreover, at least a portion of controller (121) may be remote from housing (103) in some versions.

The control by controller (121) may include activating pressure source (117) to apply pressure through process chip (111) to drive fluidic movement, among other tasks. Controller (121) may be completely or partially outside of housing (103); or completely or partially inside of housing (103). Controller (121) may be configured to receive user inputs via a user interface (123) of system (100); and provide outputs to users via user interface (123). In some versions, controller (121) is fully automated to a point where user inputs are not needed. In some such versions, user interface (123) may provide only outputs to users. User interface (123) may include a monitor, a touchscreen, a keyboard, and/or any other suitable features. Controller (121) may coordinate processing, including moving one or more fluid(s) onto and on process chip (111), mixing one or more fluids on process chip (111), adding one or more components to process chip (111), metering fluid in process chip (111), regulating the temperature of process chip (111), applying a magnetic field (e.g., when using magnetic beads), etc. Controller (121) may receive real-time feedback from sensors (105) and execute control algorithms in accordance with such feedback from sensors (105). Such feedback from sensors (105) may include, but need not be limited to, identification of reagents in vials in reagent storage frame (107), detected fluid levels in vials in reagent storage frame (107), detected movement of fluid in process chip (111), fluorescence of fluorophores in fluid in process chip (111), etc. Controller (121) may include software, firmware and/or hardware. Controller (121) may also communicate with a remote server, e.g., to track operation of the apparatus, to re-order materials (e.g., components such as nucleotides, process chips (111), etc.), and/or to download protocols, etc.

III. Example of State Machine Based Application

Figure 2:
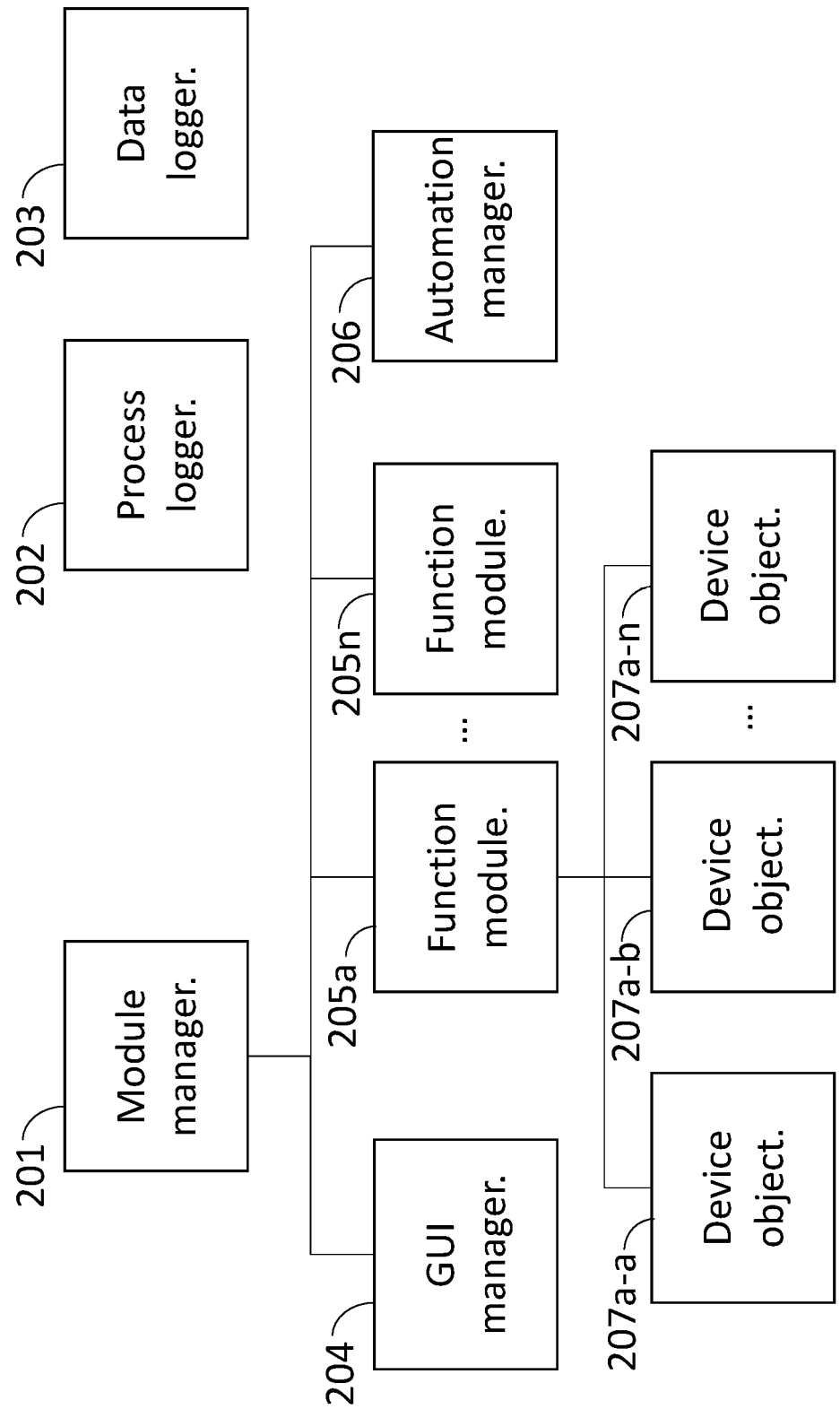
FIG. 2 depicts an example architecture which may be used in implementing an application.

To utilize a system such as shown in FIG. 1 for purposes such as manufacturing and formulating polynucleotides, a user may provide input for controlling the system (100) via its user interface (123) and/or may develop scripts comprising device operations defining actions to be performed by the system's components. To facilitate such activities, in some aspects there may be provided an application for responding to such inputs and processing such scripts which has an architecture such as shown in FIG. 2. In this type of architecture, the application may comprise a plurality of modules, each of which may be an instantiation of a module class which provides public methods that allow for a module to create and/or communicate with other modules. For example, each module may include a ProceedOperation method which allows other modules to communicate commands to it that it should execute, and a constructor which could perform operations such as allocating memory for queues that would be used to hold incoming commands, storing references to other modules that a module may need to communicate with, and/or generating a unique identifier that could be used to track the module's operation during execution of the application.

In an application using an architecture such as shown in FIG. 2, this type of communication through public methods may take place in a variety of manners. For example, in some cases when an application is launched it may initially instantiate three top level modules—a module manager (201) for processing input and scripts, a process logger (202) for recording operations performed (and errors detected) by the application, and a data logger (203) for recording data generated in the operation of the application (e.g., readings from a thermal control (113)). One or more of these top level modules may then instantiate their own lower level modules. For example, in some cases a module manager (201) may spawn a set of modules, including a graphical user interface (GUI) manager (204) for graphical interaction with a user, a set of one or more intermediate or mid-level modules, which may also be referred to as function modules (205*a*)-(205*n*) for issuing commands to functional units (e.g., thermal control (113), sensors (105), etc.), and an automation manager (206) for translating between device operations that would be written into external scripts and application commands that would be executed by the application.

In some cases, instantiation of function modules such as described above may be done by a top level module (e.g., the module manager (201)) calling the constructor function of a module class corresponding to each of the function modules to instantiate. The top level module may then store references to each of the modules it instantiates, and may also share those references between the modules if the application is implemented to enable modules on a single level of the hierarchy to communicate with each other. For example, in implementing an application in which a second function module (205*n*) may require a first function module (205*a*) to complete a complex task, once the first function module (205*a*) had been instantiated, a reference to that module may be provided to the constructor of the second function module (205*n*) for use in later communication. In the event that instantiation of the first function module (205*a*) failed, then the second function module (205*n*) may still operate, but the features that would have involved communication with the first function module (205*a*) may be disabled. In this way, a hierarchy such as illustrated in FIG. 2 may define paths and data structures for use in communicating commands between various portions of an application.

In addition to the modules illustrated in FIG. 2, in some cases an application may also include one or more device objects (207*a-a*)-(207*a-n*) which may be modules instantiated by function modules and may correspond to physical devices that the application may control. For example, if an application following the architecture of FIG. 2 included a function module (205*a*) for issuing commands to a thermal control (113), that function module (205*a*) may instantiate two device objects (207*a-a*) (207*a-b*), one corresponding to a Peltier device and one corresponding to a heated clamp. These modules may then communicate by passing commands using references to each other such as may have been created above using the various modules' constructors.

Figure 3:
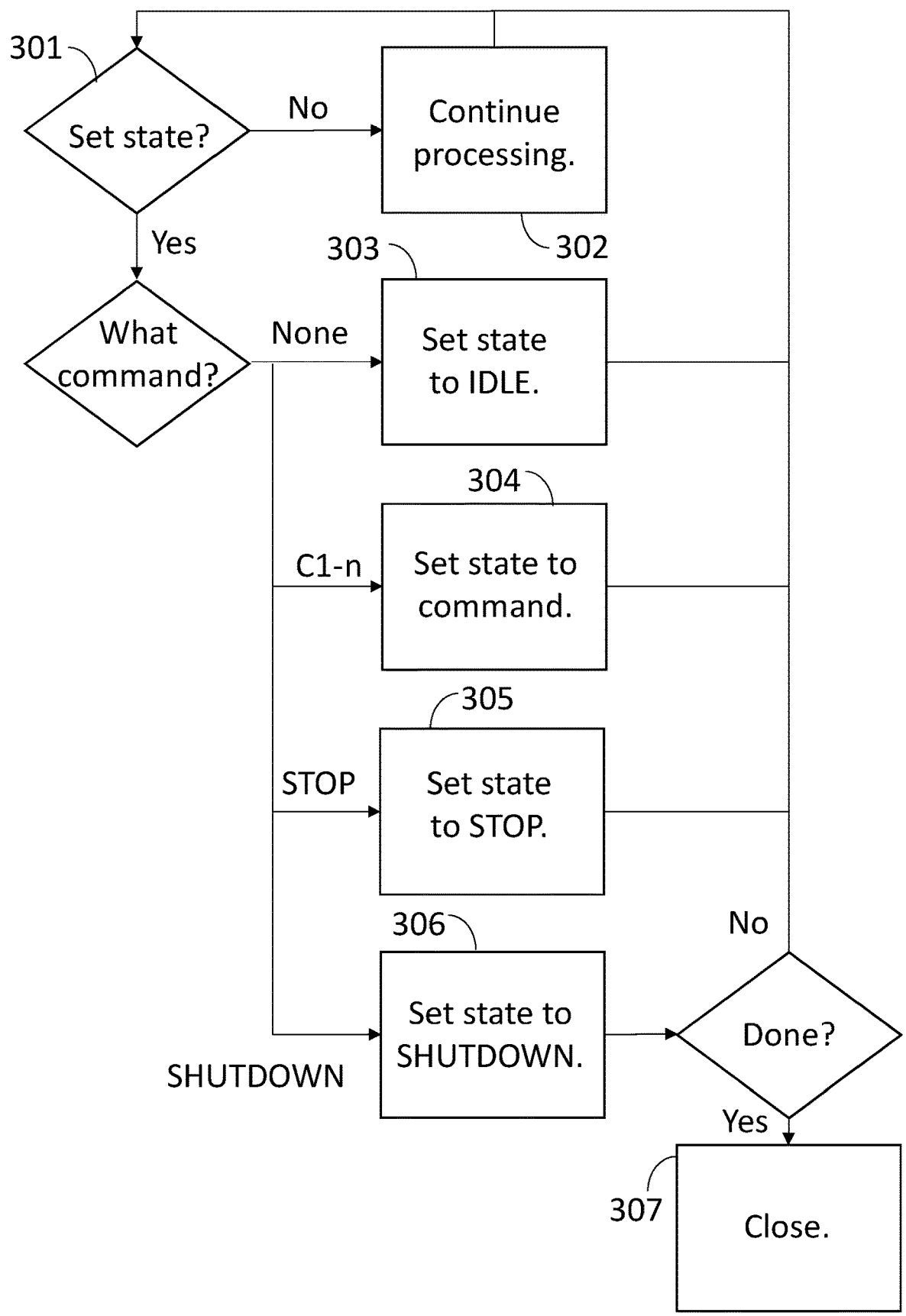
FIG. 3 depicts an example process which may be performed in execution of a module implemented as a state machine.

Turning now to FIG. 3, that figure illustrates an example method which may be used by a module to execute commands such as may be received through a publicly accessible ProceedOperation method when the module is implemented as a state machine that stores incoming commands in a queue and is executed in a loop on a dedicated thread until it is shut down. In a method as shown in FIG. 3, on each iteration of the module's loop, it may make a decision in decision block (301) regarding whether it should set (and potentially change) its state. This may be done, for example, by checking if it was already occupied (e.g., with executing a command which had been received in a previous iteration but was not yet complete). If the module was already occupied, then it may continue with whatever process had occupied it in block (302). Otherwise, it may set the module's state based on the command, if any, at the head of the queue.

As shown in FIG. 3, a state machine based module may have a variety of states it may transition into (or remain in). For example, if there is no command in the command queue, then the module's state may be set (or remain) as IDLE in block (303). The IDLE state may be a state in which the module will take no action, but it may also be a state in which background tasks are performed when no other commands have been received. For example, in a function module corresponding to a thermal control (113), during the IDLE state, the module may take and record temperature measurements. Alternatively, if there is a command in the queue, it may cause the module to switch to a state corresponding to the command. In the diagram of FIG. 3, this is represented in block (304), in which, in response to receiving an application command (e.g., in a module adapted to execute n commands corresponding to commands that may issue from a user interface or a script, this may be any of commands 1-*n*), the module may be placed in a state corresponding to that command.

To illustrate the state setting of block (304), consider the example of a function module corresponding to a thermal control (113). An application which includes such a module may send a set temperature command (TC_SETTEMP) to that module, and the module may be configured to enter into a set temperature (TC_SETTEMP) state when such a command was received. In that state, it may be programmed to perform such actions as would be necessary to set the temperature as indicated by the command. This may include:

1) Determining the physical device (e.g., a Peltier heater, or a heated clamp) whose temperature is to be set (e.g., by receiving this information as a parameter of the TC_SETTEMP command);
2) Sending a command to the device object corresponding to that physical device instructing it to set the temperature of that device to the specified temperature (e.g., by passing a temperature included as a parameter to the TC_SETTEMP command to the appropriate device object using a reference which was created when that device object was spawned);
3) Waiting for the device object to confirm that it received the command (e.g., by including an address for the device object to send its reply to when sending the command, and monitoring that address until either the receipt confirmation is received or a preset timeout expires); and
4) Waiting for the device object to confirm that the command has been successfully executed (e.g., by monitoring an address sent with the command until either a success conformation is received or a preset timeout expires).

In addition to states corresponding to commands for device operations (e.g., setting a temperature), a state machine based module may also include states corresponding control commands such as STOP and/or SHUTDOWN. When in a STOP state (which the module may enter in block (305) after receiving a STOP command) the module may take actions to halt the operation of the device(s) it would otherwise control. For instance, in the case of a function module corresponding to a thermal control (113), when in the STOP state, the module may execute commands to de-energize the heating elements in the system (100) being controlled (e.g., by sending additional STOP commands to the device objects corresponding to those heating elements). Similarly, when in a SHUTDOWN state (which the module may enter in block (306) after receiving a SHUTDOWN command) it may not only halt operation of the device(s) the module would otherwise control, but, once the operation of those devices was halted, may also shut down the module by, in block (307), deallocating the memory that had previously been allocated to it (including by deallocating any objects that the module had previously instantiated).

Figure 4:
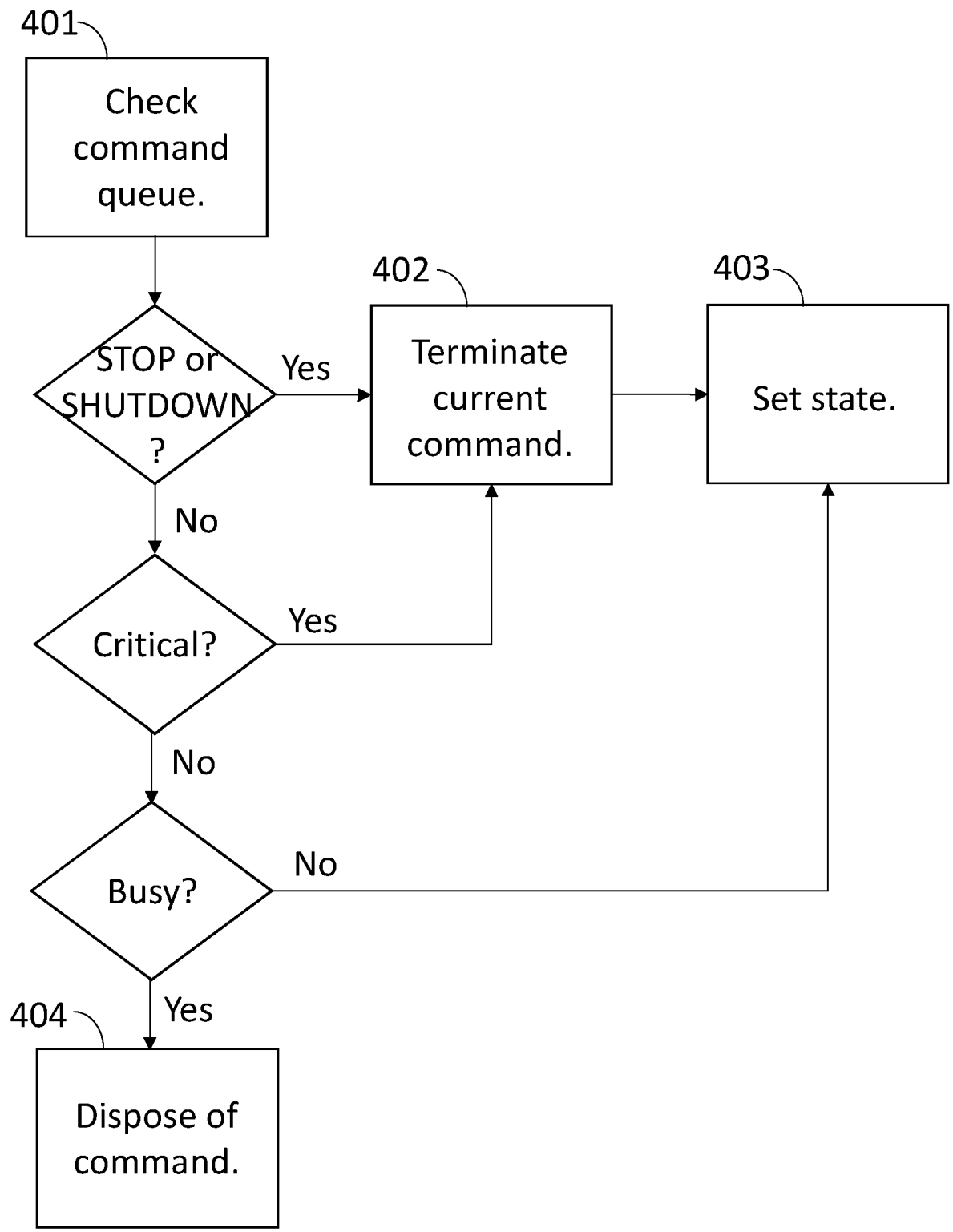
FIG. 4 depicts an example process which may be performed in execution of a module implemented as a state machine.

Variations on state machine based implementations such as described in the context of FIG. 3 may also be possible. For example, a system may be implemented based on this disclosure in which analysis beyond that discussed above may be performed when determining whether to set a module's state. To illustrate, consider FIG. 4, which depicts exemplary processing which may be performed in some cases on each cycle of a state machine to determine if its state should be set. Initially, in block (401), a module executing a process such as shown in FIG. 4 may check its command queue to see if it has received a command. If it has, and the command is a STOP or SHUTDOWN command, then, in block (402), any commands which were already being executed may be terminated, and the process may continue in block (403) to set the state of the module (e.g., by setting it to a STOP or SHUTDOWN state using a process such as shown in FIG. 3). Similarly, if there was a non-STOP, non-SHUTDOWN command in the queue with critical priority, then any commands that were already being executed may be terminated in block (402), and the state may be set in block (403) to execute the critical priority command.

In the process of FIG. 4, if there was no command in the queue that may cause a currently executing command to terminate then, if the module was busy, it may dispose of any command in the queue in block (404). This may involve clearing the queue and sending a reply back to the module that issued the command indicating that the command was being disposed of without being executed. Alternatively, if the module was not busy, then it may simply proceed to setting its state in block (403) using whatever command was present in the queue (or, if no command was present in the queue, to IDLE).

Further variations beyond those described above in the context of FIG. 4 may also be possible. For example, in some cases, in addition to, or as an alternative to, sending a reply when a command had been disposed in block (402), a module performing a process such as shown in FIG. 4 may send a message to the source of a command when the command was executed (e.g., after having its state set in block (403)) and/or if the command was terminated (e.g., as a result of a STOP or SHUTDOWN command in block (402)). Similarly, in some cases, instructions may be identified with priorities other than critical priority (e.g., high priority, normal priority), and a module receiving such commands may execute them in priority order even if that was not strictly the order in which they were received (e.g., by sorting its incoming command queue based on priority).

To facilitate utilization of the type of logic shown in FIG. 4, or to support other functionality in an application created based on this disclosure, some examples may implement modules such as shown in FIG. 2 using a class hierarchy in which a base class defines requirements and functionality which would flow down through the various modules. For example, it is possible that there may be a module class which includes a function (e.g., ReceiveCmd( )) encoding logic such as described in the context of FIG. 4, and the module manager (201) and each module or application shown as descending from it in FIG. 2 may either implement or inherit from the module class. In this way, various modules such as shown in FIG. 2 may utilize the ReceiveCmd( ) functionality without it having to be re-coded on an object by object basis.

A class hierarchy may also include items beyond the module manager and its children illustrated in FIG. 2. For example, in some cases a module class such as may be instantiated as the module manager may itself be a child of a more general object class. In examples where this type of general object class exists, it may provide functionality which may not only be useful to a state machine based module, but may also be useful for other types of entities. This type of base functionality may include error logging, which may be supported by including a method which would encapsulate information about an error (e.g., a status code and description of the error) and post it to a publicly available error queue. An object class may also, or alternatively, include functionality for tracking the object itself, such as a constructor which, when an instance of a class inheriting from the object class was created, may automatically generate a unique identifier for that instance, a name for that instance, and a timestamp for when that instance was created.

Figure 5:
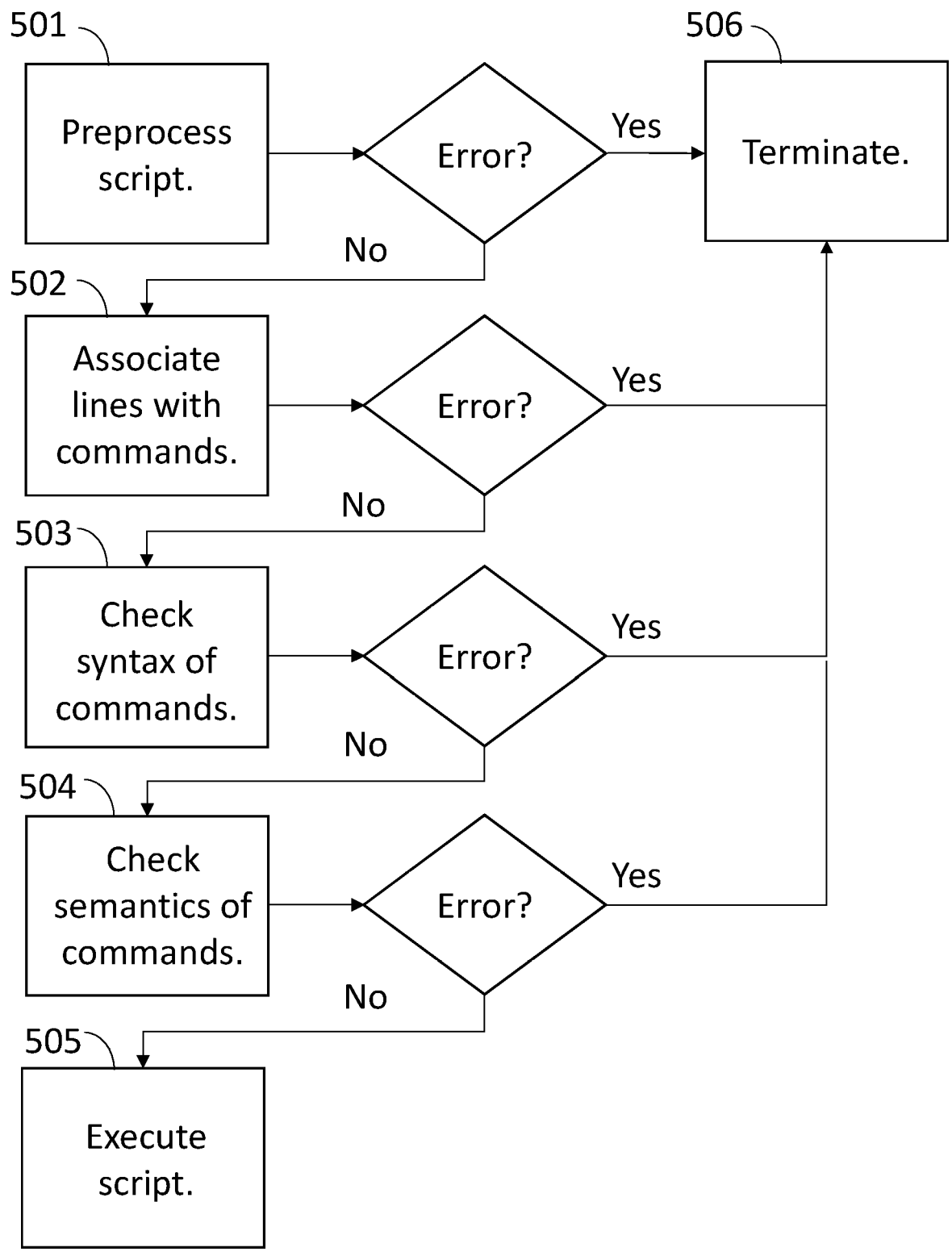
FIG. 5 depicts an example process which may be performed which may be used in converting device operations in a script into uniquely identifiable application commands.

To illustrate how this type of tracking functionality may be applied, consider the example of tracking execution of application commands corresponding to device operations from scripts by an application following a state machine implementation such as shown in FIG. 3. In some cases, to support this type of tracking, a module such as an automation manager (206) may convert a script comprising device operations (e.g., energizing a heated clamp, setting its temperature to a certain value) into a series of uniquely identifiable application commands using a process such as shown in FIG. 5. Turning to that figure, in block (501) a script may initially be preprocessed, such as by removing empty lines or comments that may have been included when the script was created for readability and maintainability purposes, and/or converting it to a line by line representation such as by splitting device operations that may have been included in a single line into multiple lines. In block (502), the device operations in the preprocessed script may be associated with commands that the application could execute on a line by line basis. For example, if the script included a device operation SETTEMP, then this command may be checked against data indicating that a SETTEMP device operation would be internally represented by a TC_SETTEMP command in the application.

In the process of FIG. 5, once the device operations from the script had been associated with commands, in block (503) that association information may be used to check the operation against the syntax of the associated command. For example, an application may be defined to execute a TC_SETTEMP command with two parameters—a name of a device whose temperature was to be set, and a temperature to which it should be set. In such a case, if a SETTEMP command in a script was associated with only a single parameter (e.g., a temperature, but no device name), then this may cause that script to fail the syntax check of block (503). In some cases, this type of checking may be supported by providing data defining each type of command that an application could execute, which may include the data specified below in table 1.

TABLE 1

| Requirement | Type | Description |
| --- | --- | --- |
| Command Name | String | A single string word associated with a particular application command and unique across all application commands. |
| Minimum required parameters | Integer | The number of parameters required for this type of application command. |
| Parameter datatypes | Array | Array where every record contains data type of the parameters in order. The size of this array may match the minimum number of required parameters and the number of "x" characters in the parameter sequence. |
| Parameter sequence | String | A single string line that describes the structure of the parameters in the command. Every parameter may be identified by an "x" character and separated by a "," character. "[ ]" characters may be used to represent an array. |

In some cases, a parameter sequence such as described above may be able to accept arrayed and non-arrayed parameters on the same line. For example, a sequence like "x,x,[x,x]" may be acceptable, and may be translated into a parameter sequence in which the first two parameters would be read, then N*2 parameters may be read until the end of the script line.

Following the syntax check of block (503), a process such as shown in FIG. 5 may continue by checking the semantics of the commands in block (504). This may be done by, for each device operation, creating an application command object using the information from the script and sending it to the module that would be responsible for executing it (e.g., the device object corresponding to the physical object that would be controlled with the device operation from the script). This module may then check that the command was one it really could execute (e.g., did it actually have instructions for a state corresponding to the command), and that its private data did not indicate some environmental or other factor that may prevent the command from being executed (e.g., a device reading that indicates a condition in which the operation would be impossible).

In the event an error was triggered in any of the operations of blocks (501)-(504), the process of FIG. 5 may terminate in block (506) by generating an error message reflecting the error which had taken place. Alternatively, if all of the operations of blocks (501)-(504) had been completed without error, then the script may be executed in block (505) by having new command objects created on a line by line basis for each of the script's device operations, and sent to the appropriate modules for execution. For example, an automation manager (206) may create a command for each operation and send it to the module manager (201). The module manager (201) may then route the command to the appropriate function module (205a)-(205n) which, in turn, may route it to the device object (207a-a)-(207a-n) corresponding to the physical device which would be controlled by execution of the device operation. The device object may then generate appropriate inputs to provide to the interface of its corresponding physical device to put the device operation into effect. In this type of scenario, the application may leverage the fact that each device operation from a script is converted to a uniquely identifiable application command by logging each of the communications described above, as well as any errors related to those communications (e.g., a module was busy when the application command was sent to it, and the command timed out rather than being executed; there was a hardware error when the device object sent its inputs implementing the command; etc.) using a public interface exposed by an object such as a process logger (202). Accordingly, even when a script includes multiple commands of the same type, a particular error may easily be traceable to the specific command which triggered it.

In some examples, in addition to, or as an alternative to, communicating application commands as instances of a command class, replies to such application commands may be generated as instances of a reply class which may be part of an inheritance tree such as that described above. Such a Command Reply class may include information and/or functionality inherited from a base class (e.g., a unique identifier, data indicating time an instance of the class was generated, etc.) and may also include additional information specific to replying to a command. Such information may include, for example, status information that may be logged and later used to trace operation of the application if and as needed. Such statuses may include those set forth below in table 2.

TABLE 2

| Name | Description |
| --- | --- |
| Executed | Command was received and its execution was initiated (e.g., the module to which the command was sent entered a state corresponding to that command). |
| Disposed | The command was received, but the module which received it was busy and so the command was disposed rather than being executed. |
| Not delivered | There was no reply from the module to which the command was sent before a timeout associated with the command expired. |
| Finished | The module to which the command was sent completed it without error. |
| Terminated | The module to which the command was sent received a new command which overrode it (e.g., a STOP or SHUTDOWN command) while the command was in progress, resulting in its termination. |
| ERROR | The operation driven by the command ended with an error, or the module to which the command was sent could not finish the operation in time. |

In operation, a Command Reply class such as described above may work synergistically with a Command class as described previously. For example, in some cases module classes may include a function to send commands to the modules that would execute them (e.g., a SendCmd function). This function may take a command object as input, along with a reference to where replies to the command should be directed (e.g., a reference to a reply queue maintained by the sending module). The send command function may use this information to enqueue the command in the command queue of the receiving module (e.g., using a ProceedOperation method) and may provide a command reply object as a return value, in this way allowing the sending module to receive a reply even in the event that the command was never acknowledged by the receiving module. In this type of implementation, a successful command may generate two replies, one when the receiving module receives the command, and one when the execution of the command is complete. In some cases, this may be used by developers to create logic which incorporates relationships between processing across modules, such as where a first module would send a command to a second module, and then wait for that second module to complete the command for proper scheduling before proceeding with subsequent operations.

Figure 6:
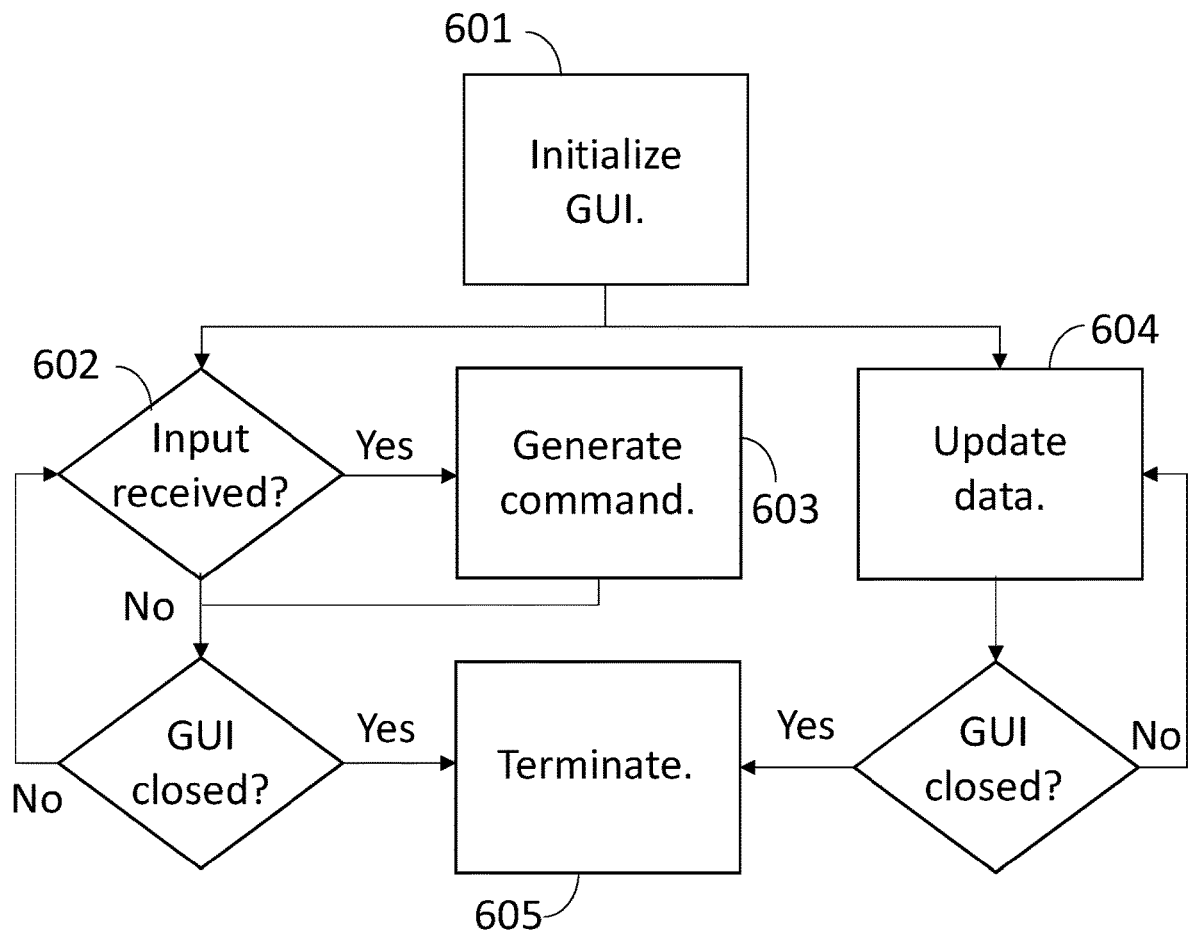
FIG. 6 depicts an example process which may be performed for generating, maintaining and operating a graphical user interface.

It should be understood that, while the above examples described how an application may execute commands corresponding to device operations from scripts, implementations of the disclosed technology may not be limited to that type of command execution. For example, in some instances an application implemented based on this disclosure may expose a graphical user interface (GUI) allowing a user to provide inputs that may be executed in a manner similar to that described above for device operations in scripts. In an application providing this type of functionality, a GUI may be generated, maintained and operated using a method such as shown in FIG. 6. In a method such as shown in FIG. 6, a module (e.g., a function module (205*a*) for controlling a thermal control (113)) may initialize a GUI in block (601) by creating a GUI as an object and storing a reference to that object in its (i.e., the module's) private data. This object may then launch two while loops that would continuously execute in parallel (e.g., by running them on separate threads), a control loop comprising blocks (602) and (603) and an indicator loop comprising block (604).

Turning to the specific loops shown in FIG. 6, in the control loop, in block (602) a check may be made for whether a user has provided input to the GUI that would trigger an operation in the system being controlled. If so, then a command corresponding to that operation could be generated in block (603) and dispatched to the appropriate modules for execution such as described previously in the context of FIG. 3. In the indicator loop, in block (604) the data displayed on the GUI could be updated, such as by propagating it from the private data of the module which was running the GUI. In both cases, the loops could continue until the GUI was closed (e.g., because the module running the GUI received a SHUTDOWN command), in which case the process would terminate in block (605).

It should be noted that, while a method for generating, operating and maintaining a GUI such as shown in FIG. 6 may be performed by a module that would also be responsible for controlling particular aspects of a system, in some cases other modules may be involved in the generation, operation and/or maintenance of a GUI as well. For example, in some cases a GUI manager (204) may present a unified view of GUIs generated by multiple individual modules in the application. For instance, a GUI manager may obtain references to data objects encoding GUIs generated by various function modules, and may then use those references to display a combined GUI to a user. Other approaches may also be implemented in some cases. For example, in some cases a module manager (201) may collect references to GUIs for each of its individual function modules (205*a*)-(205*n*), and pass those references to a GUI manager (204) for display. Accordingly, the description above should be understood as being illustrative only of approaches to implementing GUIs, and should not be treated as limiting.

As another example of a potential type of functionality that may be provided by an application implemented based on this disclosure, consider logging of data captured by the application. As noted previously, in some cases a process logger (202) may provide a public interface which could record information such as when various objects (e.g., commands, replies) were created, those objects' unique identifiers, and any errors generated by those objects. Similarly, in some cases a data logger (203) may provide a similar public interface for recording data captured during the application's operation. For example, in some instances, when a module captures a measurement from the system being controlled, it may encapsulate that measurement in an object having information such as indicated below in table 3

TABLE 3

| Information Required | Information Type | Information Description |
| --- | --- | --- |
| Measurement Name | String | Name of the measurement (e.g., pressure main line) |
| Unit of Measurement | String | Unit of measurement (e.g., Psi) |
| Display Sampling Rate | Double | Number of measurement points to capture per second |
| Visualize | Bool | True/false value indicating whether this measurement is shown on a GUI |
| Last value | Varies | The latest data value |
| Value data type | Varies | The type of the data (e.g., string, double, etc.) |
| Measurement type | Enum | The type of the measurement. |

This information may then be provided to the data logger (203) by the module calling a method (e.g., DataLog( )) which it may have inherited from its base class to add to a queue maintained by the data logger (203).

Figure 7:
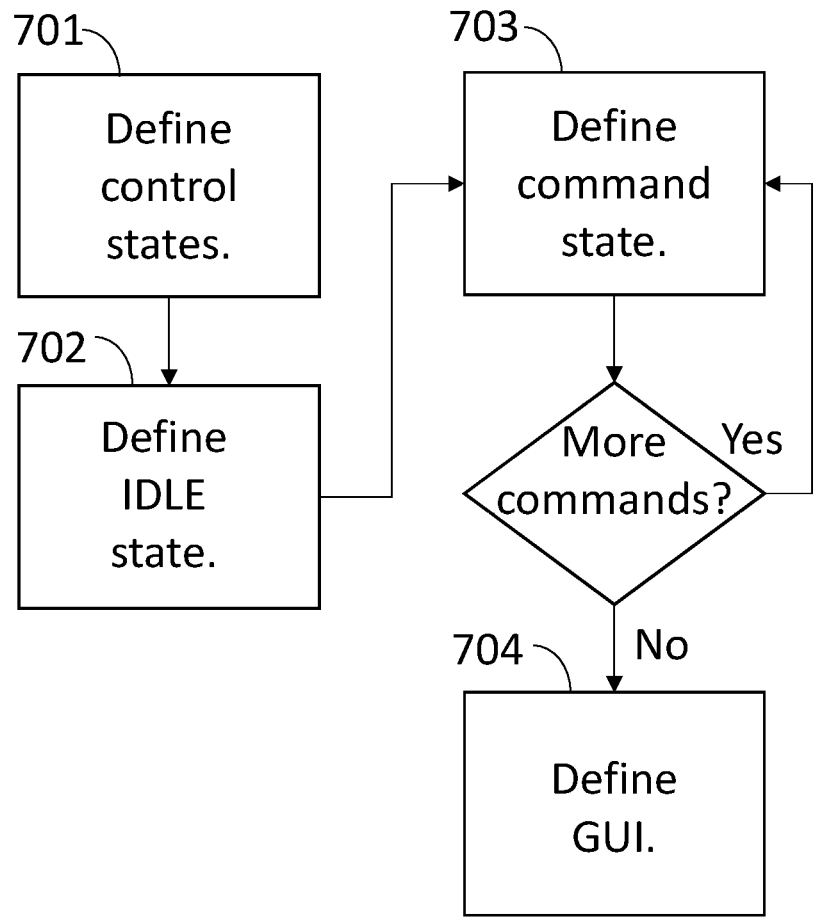
FIG. 7 depicts an example process which may be used in creating a state machine based module.

Turning now to FIG. 7, that figure illustrates an example method which may be used to create a module in an application implemented based on this disclosure. In that method, in block (701), a set of control states may be defined for the module. This may include, for example, defining actions which should be taken when the module enters a SHUTDOWN or STOP state. For example, if the module is a function module, this may include sending SHUTDOWN or STOP commands to each of the device objects that the function module had previously instantiated, and, in the case of a SHUTDOWN module, may include invoking destructors or taking other actions (if any) necessary to deallocate the memory for previously instantiated device objects. Similarly, if the module was a device object corresponding to a specific physical device, then the actions may include providing specific inputs to an interface exposed by the corresponding physical device so that that device would be deactivated (or otherwise put into a quiescent state).

Other types of control states may, either in addition to, or as alternatives to, STOP and/or SHUTDOWN states, be defined in block (701). For example, in some instances, a module may enter into a BOOTUP state when its constructor is called, or if it needs to be reset during execution of an application. In such a case, defining the BOOTUP state may include instantiating and creating and storing references to various lower level modules, establishing connections with specific physical devices, defining various default values that should be stored by the module or provided to its corresponding physical devices on startup, and/or defining error logic for catching exceptions that may occur during the booting up process.

After the control states had been defined in block (701), the method of FIG. 7 may proceed with defining the module's IDLE state in block (702). As described previously, this IDLE state may include operations which may be performed when the module was not processing some explicit command, such as may have been generated by converting a device operation from a script or a user input to a GUI. In some implementations which include this type of IDLE state, defining the IDLE state in block (702) may include capturing information from a system being controlled and logging that information using a public interface of a data logger (203) as described previously. Other types of actions, or even no action at all, may be included in an IDLE state in some cases, depending on the module being created, and so the description of defining an IDLE state above should be understood as being illustrative only, and should not be treated as implying limitations on the protection provided by this document or any related document.

The process of FIG. 7 also includes, in block (703) defining a command state. This may be performed by defining one or more actions and/or logical operations that would be executed to implement the various commands that the module could be expected to receive. For example, in some cases, this may include defining one or more operations that a module following a state machine implementation such as shown in FIG. 3 may perform on a single iteration of the state machine's operation loop, followed by setting the state of the module to IDLE for the purpose of processing commands (or performing operations defined for the IDLE state if no command was received) on the next iteration. In some cases, this may include designing the state machine to be non-blocking, such as by defining the operations to be performed so that, to the extent they include any kind of loop (e.g., a for loop), those loops would have deterministic ends, and may not include while loops or other types of potentially non-deterministic looping constructs. Similarly, for error logging purposes, in some cases the final operation of any command state may be to call a function which would communicate any errors that had been detected during performance of the command to a process logger (202) (e.g., by calling a dedicated ERRLog( ) method inherited from a base class). Other types of programming practices may also be utilized in defining a command state, such as requiring that all command states corresponding to device operations that may be included in a script may be included in a higher level module (e.g., a module manager (201) or a function module (205a)-(205n)), while all low level modules (e.g., device objects (207a-a)-(207a-n) would only receive commands from the function modules that instantiated them. Accordingly, the description above of how a command state may be defined in block (703) should be understood as being illustrative only, and should not be treated as limiting.

It should be understood that, just as different programming practices may be utilized in defining a command state in block (703), the definition of a command state in block (703) may include definition of more complex operations than may be included in a single iteration of a state machine's operation loop. An example of a method for how these types of more complex operations may be defined is provided in FIG. 8. In that method, operations which may be performed when the state machine is in the state corresponding to the command may be defined in block (801) (e.g., using programming practices such as described previously in the context of block (703)). Additionally, in block (802), additional operations that may be performed when the module is next in the IDLE state may be defined. This may include defining logic through which those operations may be carried over and associated with the IDLE state on future iterations of the module's operation loop, such as by placing those operations in a buffer that would carry across loop iterations. The method of FIG. 8 also includes, in block (803), defining error logic. This logic may be used to detect situations which may prevent actions defined in blocks (801) and/or (802) from being performed and could result in the errors being logged using a process logger (202) as described previously. The method of FIG. 8 also includes defining, in block (804), the state that the module should enter on the iteration following receiving the command as the IDLE state. Subsequently, when the module entered its IDLE state, it may execute the operations defined in block (802), and this may continue until all of the operations associated with the command had been completed. In this way, operations for a command may extend across multiple state machine loops. Additionally, in some cases an implementation which allows operations to be performed in subsequent IDLE states may allow for concurrent IDLE handling of multiple commands, such as if the operations added to a buffer had not been completed before another command added its own commands to that same buffer. In this way, new commands may be received even as the previous commands were ongoing.

Figure 9:
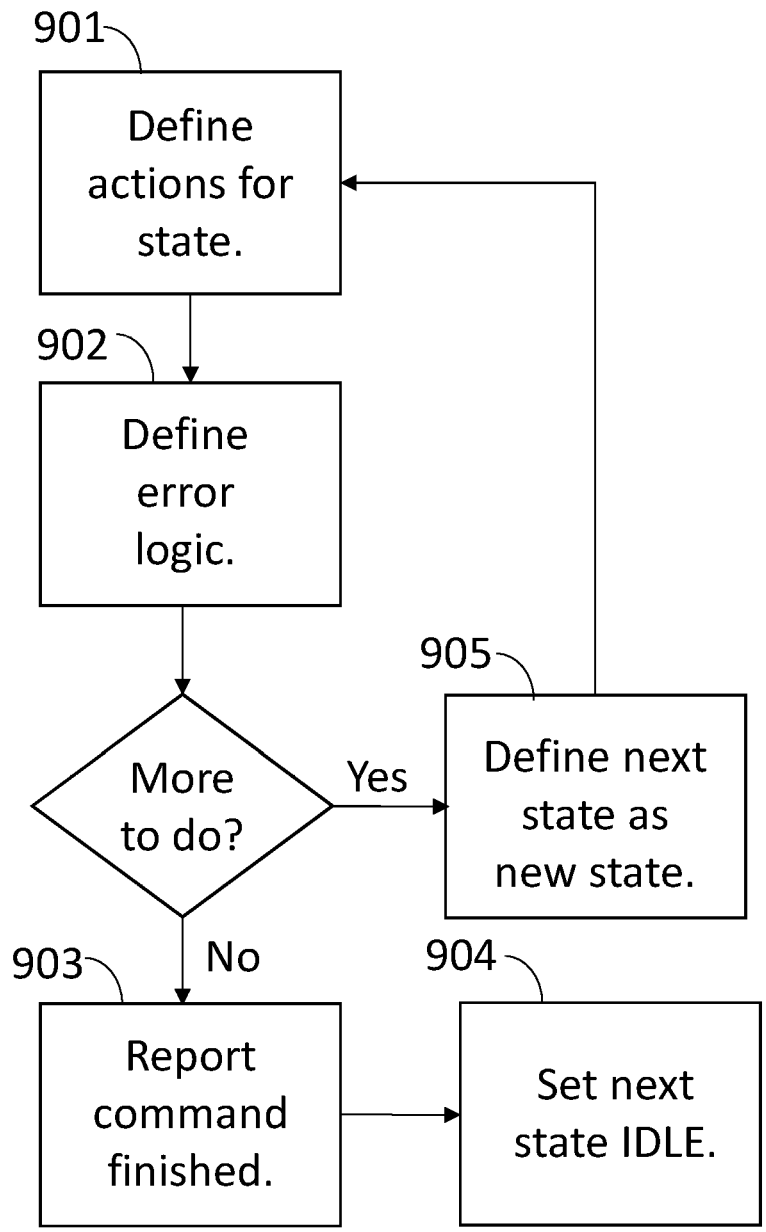
FIG. 9 depicts an example process which may be used to define operations that may be performed across multiple operation cycles of a state machine.

Other approaches to handling commands with operations extending across multiple loops may also be possible in some cases. For example, FIG. 9 illustrates a method for defining how a multi-iteration command could be executed using new states dedicated to completing the command. In that method, actions that may be performed when the module was in its initial state (e.g., the state corresponding to the command to be executed across multiple loop iterations) are defined in block (901). In block (902), error logic may be defined for identifying errors which may occur in performance of the actions defined in block (901). If the actions defined in block (901) represented all of the actions that were needed to implement the command, then code could be added to report the command finished and set the next state to IDLE in blocks (903) and (904), respectively. Alternatively, if not all actions needed to implement the command had been defined, then, in block (905) a new state may be created and defined as the next state to transition into. This new state may not correspond to any command that would be included in a script or received from a GUI, but instead may only be triggered to continue processing in the next loop iteration. Then, in blocks (901) and (902), actions and error logic may be defined for this new state, and this may continue until all actions necessary for completion of the command had been defined, at which point the command would be finished and the module could transition to the IDLE state.

Figure 10:
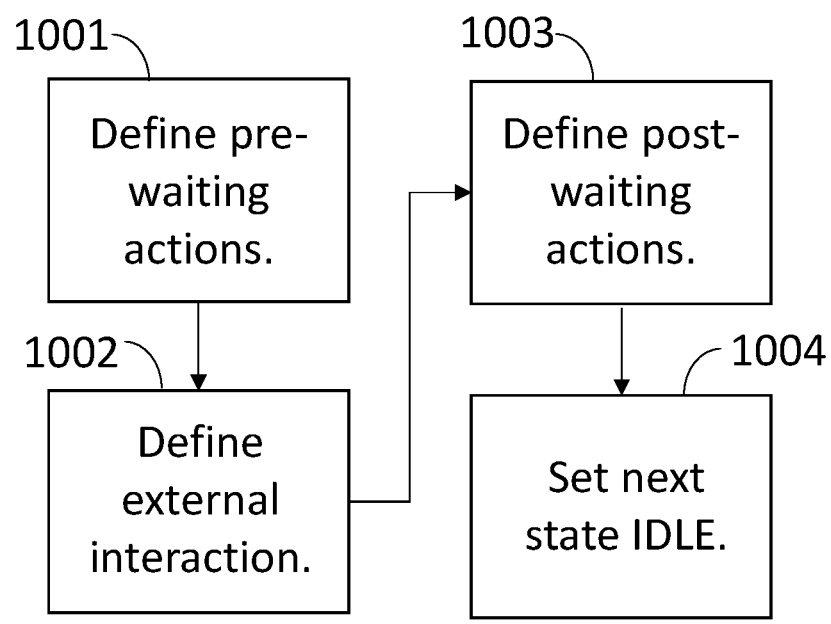
FIG. 10 depicts an example process which may be used to define operations that may be performed across multiple operation cycles of a state machine.

Yet another example of an approach to defining a state for a command whose performance may extend across multiple iterations is provided in FIG. 10, which may be used in a case where a command may require interactions between modules. In the method of FIG. 10, the actions the module may perform before having to interact with an external module may be defined in block (1001). Then, in block (1002), the interaction between the module and an external module may be defined. This may be done, for example, by including a call to a method defined for the module base class (e.g., WaitForCommandToFinish( )) and providing parameters including the command that would need to be performed by an external module and a timeout value indicating how long the module should wait. After the external interaction had been defined, in block (1003) any operations which would take place after the external module had finished its execution may be defined. Then, in a manner similar to that described for FIGS. 8 and 9, code may be added which would set the module's next state to IDLE. In operation, a module created using a method such as shown in FIG. 10 may stay in the state corresponding to the action defined using the method of FIG. 10 until the command that drove it into that state was complete (or terminated, or exited with an error, etc.). In this way, a module executing a command which required external interaction may wait for that interaction to complete without blocking such that new critical commands or commands that would override the waiting status could still be executed if necessary.

Figure 8:
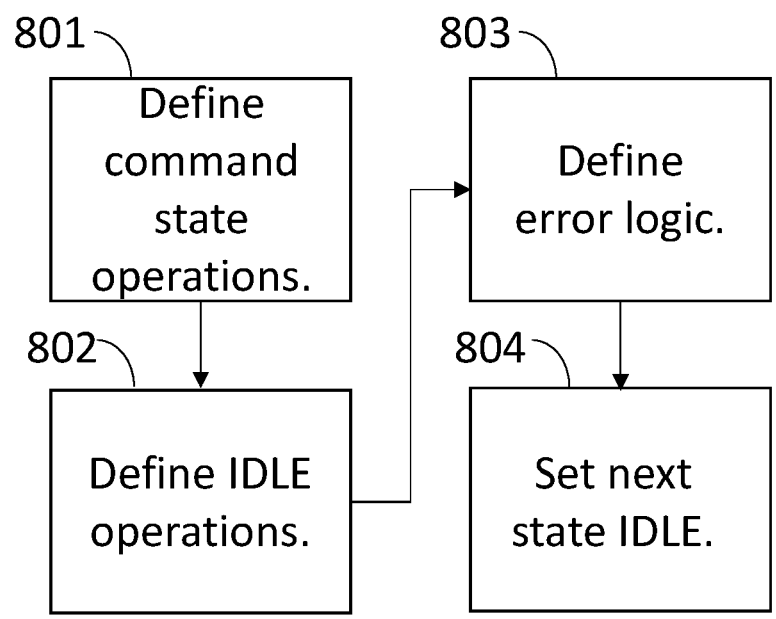
FIG. 8 depicts an example process which may be used to define operations that may be performed across multiple operation cycles of a state machine.

While FIGS. 8-10 provided examples of methods for defining state machine based modules to execute commands across multiple loop iterations, it should be understood that those examples are intended to be illustrative only, and that other variations may be implemented by, and will be immediately apparent to, one of ordinary skill in light of this disclosure. For example, in some cases combinations of approaches described above may be implemented, such as creating a state whose operations include external interactions such as described in FIG. 10, and whose operations performed before and after the external interactions (e.g., operations defined in blocks (1001) and (1003)) may extend across multiple loop iterations using techniques such as described in the context of FIGS. 8 and 9. Other variations may also be possible and may be implemented by those of ordinary skill in the art without undue experimentation based on this disclosure. Accordingly, the description above of actions which may be included in defining a command state in block (703) should be understood as being illustrative only, and should not be treated as limiting.

Continuing with the discussion of FIG. 7, after all of a module's command states have been defined in block (703), the illustrated process may continue with defining the module's GUI (if any) in block (704). This may include, for example, defining indicator and control loops as described previously in the context of FIG. 6, as well as defining the appearance of, and potential interactions that may be supported by, the GUI. Finally, with the GUI and all necessary states defined, a module created using a method such as shown in FIG. 7 may be treated as complete, and incorporated into an application such as illustrated in FIG. 2 and described previously for controlling a system (100) such as shown in FIG. 1.

Figure 11:
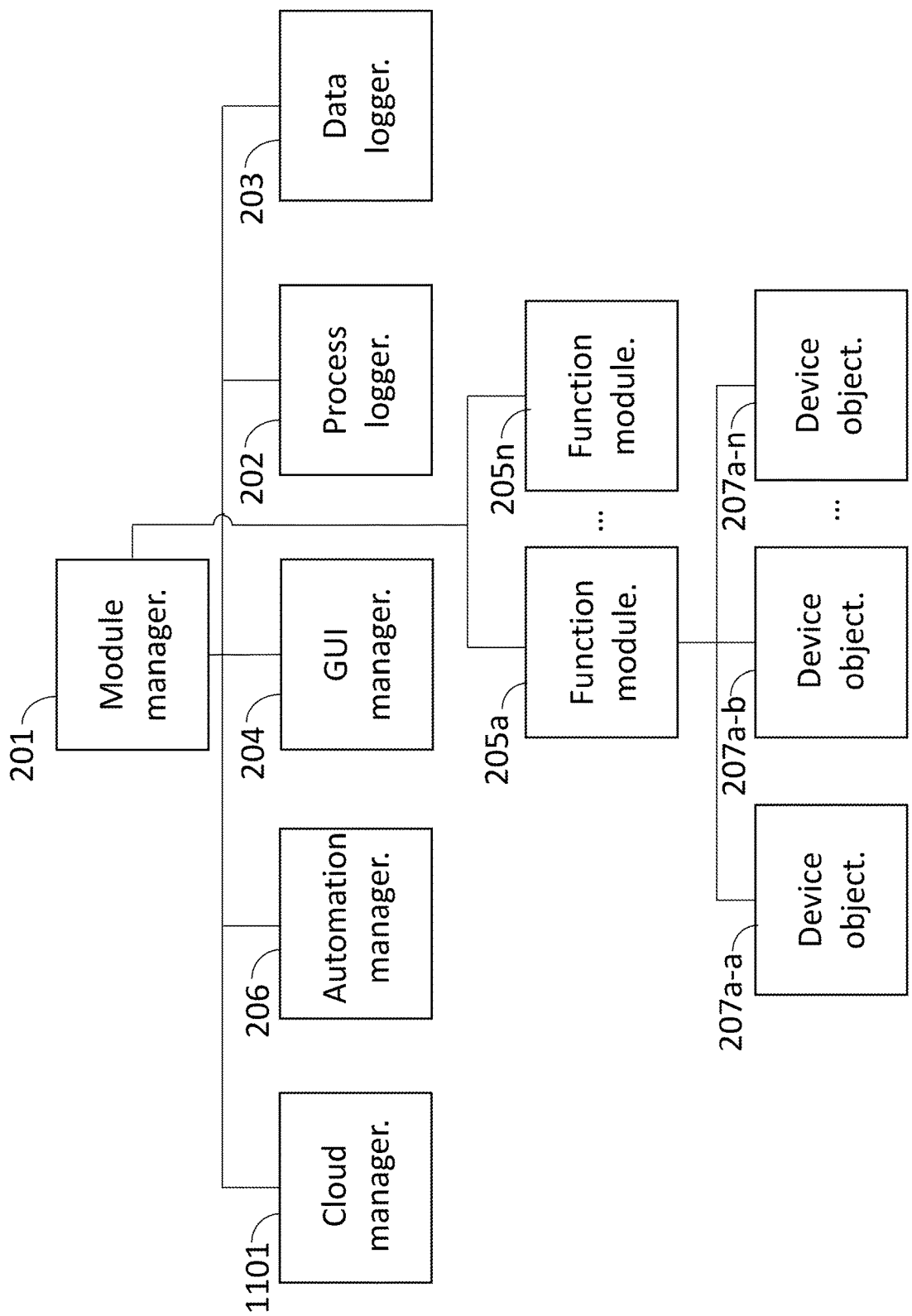
FIG. 11 depicts an example architecture which may be used in implementing an application.

Variations on the above described examples are also possible and will be apparent to, and could be implemented by, those of skill in the art without undue experimentation based on this disclosure. For instance, while an application such as described herein could be implemented using an architecture as shown in FIG. 2, in some cases an application implemented based on this disclosure could use an architecture such as shown in FIG. 11 instead. As shown in FIG. 11, such an alternative architecture may include modules similar to those discussed above in the context of FIG. 2, but may organize them in a different manner. For example, in some cases, rather than a process logger (202) and data logger (203) being instantiated in parallel with a module manager (201), a module manager (201) may be instantiated, and then may instantiate a process logger (202) and data logger (203), along with an automation manager (206) and/or other modules which may provide functionality which can be accessed by function modules (205a)-(205n).

In some embodiments (e.g., an embodiment following the architecture of FIG. 11), after instantiating modules which would provide functionality that could be used by function modules, a module manager (201) may instantiate the function modules (205a)-(205n), and provide pointers to the previously instantiated modules (e.g., process logger (202), data logger (203)) that the function modules could use to access their functionality as an alternative to using public interfaces such as described previously. In some implementations, this type of alternative access through pointers may be available instead of publicly accessible interfaces, while in other implementations, pointer based methods of accessing functionality may be made available in parallel with public interfaces, thereby giving the developers of function modules (205a)-(205n) multiple options depending on which manner of accessing the functionality of another module may be most appropriate in a given situation.

As shown in FIG. 11, in addition to having a different hierarchy in which all modules are instantiated by a module manager (201), in some cases there may also be modules in addition to those described previously, such as a cloud manager module (1101). In applications where such a cloud manager module (1101) is present, it may be used for providing other modules (e.g., function modules (205a)-(205n)) functionality for cloud operations such as uploading or downloading files. This may be done, or example, using functions accessed through references (e.g., a SendCloudData function), or public interfaces, in a manner similar to that described previously for the process logger (202) and data logger (203) modules. Other variations, such as providing additional, or different, modules from those discussed above in the context of FIGS. 2 and 11 are also possible and will be immediately apparent to those of skill in the art in light of this disclosure. Accordingly, the above discussion of variations, like the description and examples that preceded it, should be understood as being illustrative only, and should not be treated as implying limitations on the protection provided by this document or any related document.

IV. Miscellaneous

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Some versions of the examples described herein may be implemented using a processor, which may be part of a computer system and communicate with a number of peripheral devices via bus subsystem. Versions of the examples described herein that are implemented using a computer system may be implemented using a general-purpose computer that is programmed to perform the methods described herein. Alternatively, versions of the examples described herein that are implemented using a computer system may be implemented using a specific-purpose computer that is constructed with hardware arranged to perform the methods described herein. Versions of the examples described herein may also be implemented using a combination of at least one general-purpose computer and at least one specific-purpose computer.

In versions implemented using a computer system, each processor may include a central processing unit (CPU) of a computer system, a microprocessor, an application-specific integrated circuit (ASIC), other kinds of hardware components, and combinations thereof. A computer system may include more than one type of processor. The peripheral devices of a computer system may include a storage subsystem including, for example, memory devices and a file storage subsystem, user interface input devices, user interface output devices, and a network interface subsystem. The input and output devices may allow user interaction with the computer system. The network interface subsystem may provide an interface to outside networks, including an interface to corresponding interface devices in other computer systems. User interface input devices may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system.

In versions implemented using a computer system, a user interface output device may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system to the user or to another machine or computer system.

In versions implemented using a computer system, a storage subsystem may store programming and data constructs that provide the functionality of some or all of the modules and methods described herein. These software modules may be generally executed by the processor of the computer system alone or in combination with other processors. Memory used in the storage subsystem may include a number of memories including a main random-access memory (RAM) for storage of instructions and data during program execution and a read only memory (ROM) in which fixed instructions are stored. A file storage subsystem may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem in the storage subsystem, or in other machines accessible by the processor.

In versions implemented using a computer system, the computer system itself may be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the example of the computer system described herein is intended only as a specific example for purposes of illustrating the technology disclosed. Many other configurations of a computer system are possible having more or fewer components than the computer system described herein.

As an article of manufacture, rather than a method, a non-transitory computer readable medium (CRM) may be loaded with program instructions executable by a processor. The program instructions when executed, implement one or more of the computer-implemented methods described above. Alternatively, the program instructions may be loaded on a non-transitory CRM and, when combined with appropriate hardware, become a component of one or more of the computer-implemented systems that practice the methods disclosed.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A system comprising:
    a non-transitory computer readable medium storing:
        a plurality of scripts, wherein each script from the plurality of scripts:
            has a corresponding scriptable device from a plurality of scriptable devices; and
            comprises a set of device operations;
        and
    a computer to perform acts comprising performing an operation cycle comprising, based on determining that an application command should be executed, adding a globally unique identifier corresponding to that application command and a device operation corresponding to that application command to a log.

2. The system of claim 1, wherein the acts the computer is to perform comprise, for each device from the plurality of scriptable devices:
    determining when each device operation from each script for which that device is the corresponding scriptable device is comprised by a mapped plurality of device operations encoded in data stored on the non-transitory computer readable medium; and
    for each script for which that device is the corresponding scriptable device and which comprises a device operation which is determined not to be comprised by the mapped plurality of device operations, generating an error message.

3. The system of claim 1, wherein:
    the non-transitory computer readable medium further stores data indicating, for each of a mapped plurality of device operations:
        a conversion between that device operation and a corresponding application command; and
        a corresponding device module definition which defines a device module object to execute the corresponding application command for that device operation; and
    for each of the mapped plurality of device operations, the data indicating the conversion between that device operation and the corresponding application command, is comprised by the device module definition corresponding to that device operation.

4. The system of claim 3, wherein the operation cycle comprises:
receiving a run command to run a script from the plurality of scripts;
in response to receiving the run command, for each device operation from the set of device operation comprised by the script:
confirming that that device operation is comprised by the mapped plurality of device operations; and
confirming that the device operation with any associated parameters is executable by the device module defined by the device module definition corresponding to that device operation.

5. The system of claim 1, wherein:
the non-transitory computer readable medium stores data indicating, for each of a mapped plurality of device operations:
one or more inputs to provide to a corresponding device from the plurality of scriptable devices when performing that device operation; and
a conversion between that device operation and a corresponding application command;
and
when performing the operation cycle, determining whether the application command should be executed comprises:
enqueuing the application command in a queue corresponding to the device corresponding to the application command's corresponding device operation, which device is referred to herein as the application command's corresponding device; and
checking a state corresponding to a thread corresponding to the application command's corresponding device.

6. The system of claim 1, wherein:
the non-transitory computer readable medium stores data indicating, for each of a mapped plurality of device operations:
one or more inputs to provide to a corresponding device from the plurality of scriptable devices when performing that device operation; and
a conversion between that device operation and a corresponding application command;
and
when performing the operation cycle, determining whether the application command should be executed comprises receiving an instruction to control the device corresponding to the application command's corresponding device operation via a graphical user interface.

7. A method comprising, for each of a plurality of device object definitions:
allocating memory for a device object corresponding to that device object definition, wherein the device object corresponding to that device object definition comprises a command queue;
allocating a corresponding thread to execute instructions to:
track a current state of the device object corresponding to that device object definition;
when the current state of the device object corresponding to that device object definition is the same as a state specified in that device object definition, execute one or more operations specified for a command specified for the current state of the device object in that device object definition; and
determine whether to update the current state of the device object corresponding to that device object definition based on presence and priority of a command in the command queue comprised by the device object corresponding to that device object definition.

8. The method of claim 7, wherein:
each device object definition specifies a set of operations to execute while the device object defined by that device object definition is in an idle state; and
for each device object definition, the corresponding thread is to execute the set of operations specified to execute while the device object defined by that device object definition is in idle state.

9. The method of claim 8, wherein:
the plurality of device object definitions comprises a temperature controller device object definition;
the set of operations the temperature controller device object definition specifies to execute while the device object defined by the temperature controller device object definition is in idle state comprises checking a temperature of the system.

10. The method of claim 7, wherein, for each device object definition, all loops comprised by that device object definition have a deterministic end.

11. The method of claim 7, wherein:
each device object definition inherits from a module class definition; and
each data object defined by a definition that inherits from the module class definition:
is a state machine having states comprising:
an idle state;
a stop state;
a shutdown state; and
a bootup state;
and
comprises a command queue.

12. The method of claim 7, wherein:
the method comprises obtaining a plurality of intermediate module definitions, wherein each intermediate module definition comprise references to a set of device objects, each of which corresponds to a device object definition;
the method comprises obtaining a module manager definition;
each device object definition corresponding to a physical device;
for each device object definition, the module manager definition comprises instructions to control the physical device corresponding to that device object definition by acts comprising:
instantiating a command object; and
passing the command object to the intermediate module defined by the intermediate module definition which comprises a reference to the device object corresponding to that device object definition;
the command object is defined by a command object definition; and
both the command object definition and the module class definition inherit from a base object definition.

13. The method of claim 12, wherein the base object definition comprises instructions to, whenever an object defined by a definition that inherits from the base object definition is instantiated:
generate a unique identifier for that object; and
store the unique identifier in that object as private data.

14. A system comprising:
a non-transitory computer readable medium storing:
  a plurality of scripts, wherein each script from the plurality of scripts:
    has a corresponding scriptable device from a plurality of scriptable devices; and
    comprises a set of device operations;
  and
a computer to perform acts comprising:
  launching an application, wherein launching the application comprises for each of a mapped plurality of device object definitions:
    allocating memory for a device object corresponding to that device object definition, wherein the device object corresponding to that device object definition comprises a command queue;
    allocating a corresponding thread to execute instructions to:
      track a current state of the device object corresponding to that device object definition;
      when the current state of the device object corresponding to that device object definition is the same as a state specified in that device object definition, execute one or more operations specified for a command specified for the current state of the device object in that device object definition; and
      determine whether to update the current state of the device object corresponding to that device object definition based on presence and priority of a command in the command queue comprised by the device object corresponding to that device object definition;
  and
  performing an operation cycle comprising, based on determining that an application command should be executed, adding a globally unique identifier corresponding to that application command and a device operation corresponding to that application command to a log.

15. The system of claim 14, wherein the acts the computer is to perform comprise, for each device from the plurality of scriptable devices:
  determining when each device operation from each script for which that device is the corresponding scriptable device is comprised by the mapped plurality of device operations; and
  for each script for which that device is the corresponding scriptable device and which comprises a device operation which is determined not to be comprised by the mapped plurality of device operations, generating an error message.

16. The system of claim 14, wherein:
  the non-transitory computer readable medium further stores data indicating, for each of the mapped plurality of device operations:
    a conversion between that device operation and a corresponding application command;
    a corresponding device module definition which defines a device module object to execute the corresponding application command for that device operation; and
  for each of the mapped plurality of device operations, the data indicating the conversion between that device operation and the corresponding application command, is comprised by the device module definition corresponding to that device operation.

17. The system of claim 16, wherein the operation cycle comprises:
  receiving a run command to run a script from the plurality of scripts;
  in response to receiving the run command, for each device operation from the plurality of device operations comprised by the script:
    confirming that that device operation is comprised by the mapped plurality of device operations; and
    confirming that the device operation with any associated parameters is executable by the device module defined by the device module definition corresponding to that device operation.

18. The system of claim 14, wherein:
  the non-transitory computer readable medium stores data indicating, for each of the mapped plurality of device operations, a plurality of intermediate module definitions, wherein each intermediate module definition comprises references to a set of device objects, each of which corresponds to one of the scriptable devices;
  the operation cycle comprises, based on determining that the application command should be executed:
    instantiating a command object corresponding to that application command; and
    passing the command object to an intermediate module; and
  the command object, each device object, and each intermediate module instantiate a class that inherits from a common base object definition.

19. The system of claim 18, wherein the base object definition comprises instructions to, whenever an object defined by a definition that inherits from the base object definition is instantiated:
  generate a unique identifier for that object; and
  store the unique identifier in that object as private data.

20. The system of claim 14, wherein, for each device object definition, all loops comprised by that device object definition have a deterministic end.

* * * * *